United States Patent [19]

Yamagiwa et al.

[11] Patent Number: 4,965,878
[45] Date of Patent: Oct. 23, 1990

[54] VEHICLE HEIGHT CONTROL SYSTEM

[75] Inventors: Masataka Yamagiwa, Aichi; Naoki Yamada, Toyota, both of Japan

[73] Assignee: Aisin Seiki Kabushiki Kaisha, Kariya City, Japan

[21] Appl. No.: 277,986
[22] Filed: Nov. 30, 1988
[51] Int. Cl.$^5$ .............................................. B60G 17/00
[52] U.S. Cl. ................ 364/424.05; 280/707; 280/DIG. 1; 180/41
[58] Field of Search ................ 364/424.05; 280/707, 280/840, 6.11, 6.12, DIG. 1; 180/41

[56] References Cited

U.S. PATENT DOCUMENTS

| | | | |
|---|---|---|---|
| 4,526,401 | 7/1985 | Kakizaki et al. | 364/424.05 |
| 4,625,993 | 12/1986 | Williams et al. | 280/DIG. 1 |
| 4,659,104 | 4/1987 | Tanaka et al. | 280/707 |
| 4,700,303 | 10/1987 | Tokuyama et al. | 280/707 |
| 4,787,644 | 11/1989 | Yokote et al. | 280/707 |
| 4,827,416 | 5/1989 | Kawagoe et al. | 364/424.05 |
| 4,829,436 | 5/1989 | Kowalik et al. | 364/424.05 |

Primary Examiner—Parshotam S. Lall
Assistant Examiner—V. Trans
Attorney, Agent, or Firm—Banner, Birch, McKie & Beckett

[57] ABSTRACT

According to the present vehicle height control system, vehicle height adjustment does not begin unless the difference found between outputs of any two of sensors is within a predetermined range, each of which detects a height between a rotating center of a corresponding wheel and a body of the vehicle. Thus, upon the occasion of any one of the following events, the vehicle height adjustment may not be performed unnecessarily: (1) a vehicle is parking with its engine operating in such a manner that any one of its wheels is run onto the sidewalk which is considerably higher than a road surface, (2) a body of a vehicle is jacked-up at a position near any one of the wheels in a service shop, or (3) any one of the wheels has fallen into a gutter or pothole along a road and the engine is operating.

14 Claims, 13 Drawing Sheets

FIG. 7

| | VFR | VFL | VRR | VRL | CP | EX |
|---|---|---|---|---|---|---|
| REQUEST FOR RAISING RIGHT FRONT WHEEL | ON | OFF | OFF | OFF | ON | OFF |
| REQUEST FOR LOWERING RIGHT FRONT WHEEL | ON | OFF | OFF | OFF | OFF | ON |
| REQUEST FOR RAISING LEFT FRONT WHEEL | OFF | ON | OFF | OFF | ON | OFF |
| REQUEST FOR LOWERING LEFT FRONT WHEEL | OFF | ON | OFF | OFF | OFF | ON |
| REQUEST FOR RAISING RIGHT REAR WHEEL | OFF | OFF | ON | OFF | ON | OFF |
| REQUEST FOR LOWERING RIGHT REAR WHEEL | OFF | OFF | ON | OFF | OFF | ON |
| REQUEST FOR RAISING LEFT REAR WHEEL | OFF | OFF | OFF | ON | ON | OFF |
| REQUEST FOR LOWERING LEFT REAR WHEEL | OFF | OFF | OFF | ON | OFF | ON |
| REQUEST FOR INTERRUPTION OF CONTROL | OFF | OFF | OFF | OFF | OFF | OFF |

FIG. 13

| | VFR | VFL | VRR | VRL | CP | EX |
|---|---|---|---|---|---|---|
| REQUEST FOR RAISING RIGHT FRONT WHEEL | ON | OFF | OFF | OFF | ON | OFF |
| REQUEST FOR LOWERING RIGHT FRONT WHEEL | ON | OFF | OFF | OFF | OFF | ON |
| REQUEST FOR RAISING LEFT FRONT WHEEL | OFF | ON | OFF | OFF | ON | OFF |
| REQUEST FOR LOWERING LEFT FRONT WHEEL | OFF | ON | OFF | OFF | OFF | ON |
| REQUEST FOR RAISING RIGHT REAR WHEEL | OFF | OFF | ON | OFF | ON | OFF |
| REQUEST FOR LOWERING RIGHT REAR WHEEL | OFF | OFF | ON | OFF | OFF | ON |
| REQUEST FOR RAISING LEFT REAR WHEEL | OFF | OFF | OFF | ON | ON | OFF |
| REQUEST FOR LOWERING LEFT REAR WHEEL | OFF | OFF | OFF | ON | OFF | ON |
| REQUEST FOR INTERRUPTION OF CONTROL | OFF | OFF | OFF | OFF | OFF | OFF |

VEHICLE HEIGHT CONTROL SYSTEM

BACKGROUND OF THE INVENTION

1. Field of the Invention

The present invention relates generally to the field of vehicle suspension systems and, more particularly, to a vehicle height control system.

2. Description of the Prior Art

A conventional vehicle height control system, which is disclosed in U.S. Pat. No. 4,537,411, includes four sensors, each of which detects the height between a rotating center of an associated wheel and a vehicle body, four suspension devices each of which is disposed between a rotating center of an associated wheel and the vehicle body, a pressure source connected to the suspension devices, four valves, each of which is disposed between each suspension device and the pressure source, and a control means in the form of a program controlled microcomputer.

In the conventional vehicle height control system, the control means manipulates each valve so as to control the fluid communication between the pressure source and each suspension device when a sensor detects an excess height variation so that the height of the vehicle is adjusted within a predetermined range.

However, during each of the following possible vehicle operating conditions, the conventional vehicle height control system unnecessarily adjusts the vehicle height:

(1) A vehicle is being parked with its engine operating in such a manner that any one of the wheels is inadvertently run onto the sidewalk which is considerably higher than a road surface.

(2) A body of a vehicle is jacked-up with the jack positioned near any of the wheels which are in rotation, for example, in a service shop.

(3) Any one of the wheels has fallen into a gutter or a pothole along a road and the engine is operating.

SUMMARY OF THE INVENTION

It is, therefore, a principal object of the present invention to provide a vehicle height control system which overcomes the problems of prior art systems.

Another object of the present invention is to provide a vehicle height control device which detects conditions in which at least one wheel is at an abnormal height level in relation to the height level of the other wheels.

To achieve the objects and in accordance with the purposes of the present invention, a vehicle height control system comprises suspension means operated by fluid pressure for generating vertical movement of a body of the vehicle and includes a first suspension device provided near a right front wheel, a second suspension device provided near a left front wheel, a third suspension device provided near a right rear wheel and a fourth suspension device provided near a left rear wheel; a fluid pressure source; a first valve means disposed between the first suspension device and the fluid pressure source; a second valve means disposed between the second suspension device and the fluid pressure source; a third valve means disposed between the third suspension device and the fluid pressure source; a fourth valve means disposed between the fourth suspension device and the fluid pressure source; a first sensor for detecting a height between a rotating center of the right front wheel and the body; a second sensor for detecting a height between a rotating center of the left front wheel and the body; a third sensor for detecting a height between a rotating center of the right rear wheel and the body; a fourth sensor for detecting a height between a rotating center of the left rear wheel and the body; and control means, responsive to the sensors, for controlling at least one of the valve means so as to operate corresponding suspension devices unless a predetermined difference level between outputs of any two of the sensors is exceeded.

BRIEF DESCRIPTION OF THE DRAWINGS

The above and other objects, features and advantages of the present invention will become apparent and more readily appreciated from the following detailed description of preferred exemplary embodiments of the present invention, taken in connection with the accompanying drawing, in which:

FIG. 7 is a table which shows relationships between components of the vehicle height control system and each possible state of components under the first mode of operation of the vehicle height control system according to FIGS. 3 through 6;

FIG. 13 is a table which shows relationships between components of vehicle height control system and each possible state of components under the second mode of operation of the vehicle control system according to FIGS. 8 through 12.

DETAILED DESCRIPTION OF THE PREFERRED EMBODIMENTS

Figure 1:
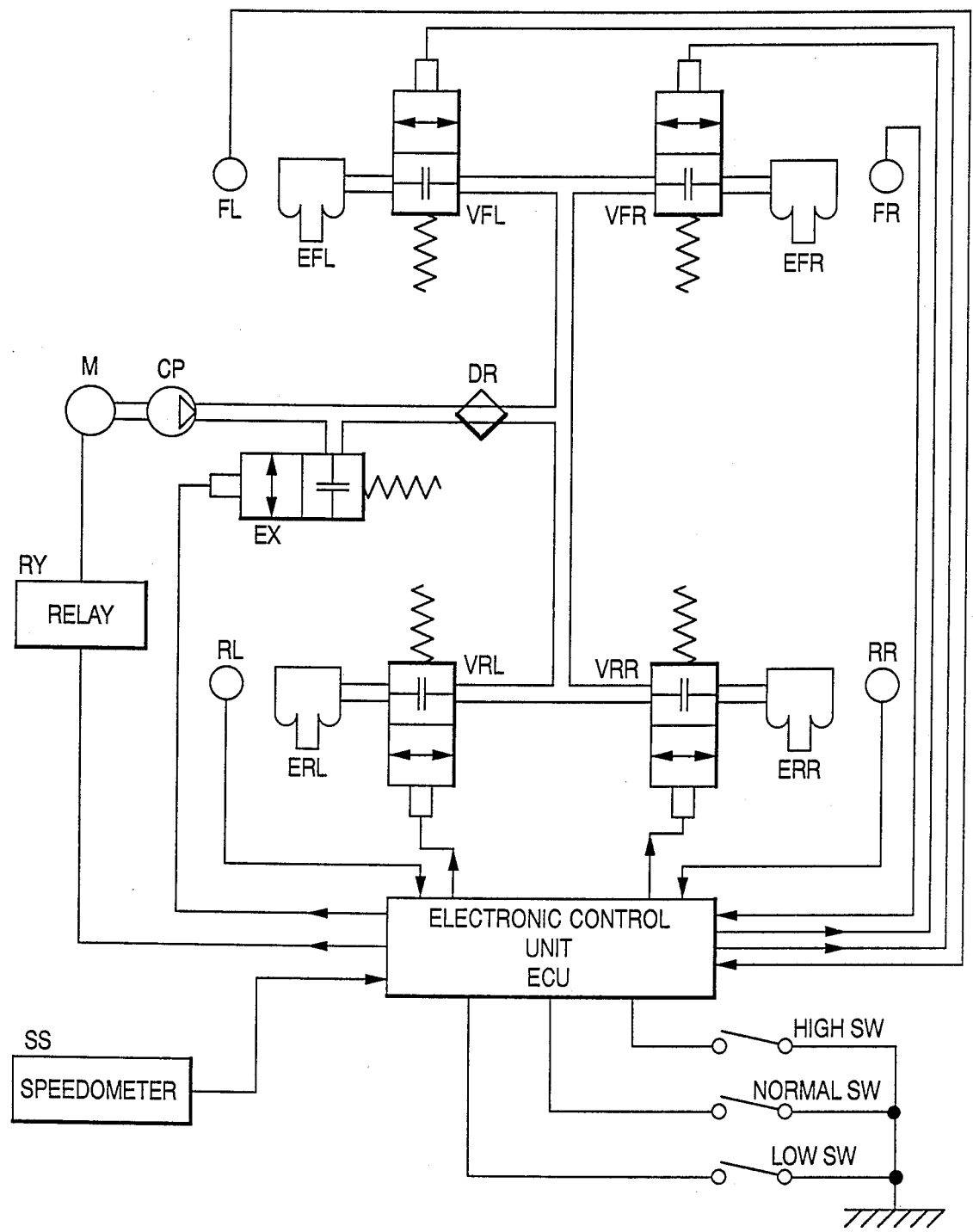
FIG. 1 is a view for illustrating a general construction of a vehicle height control system.
Figure 2:
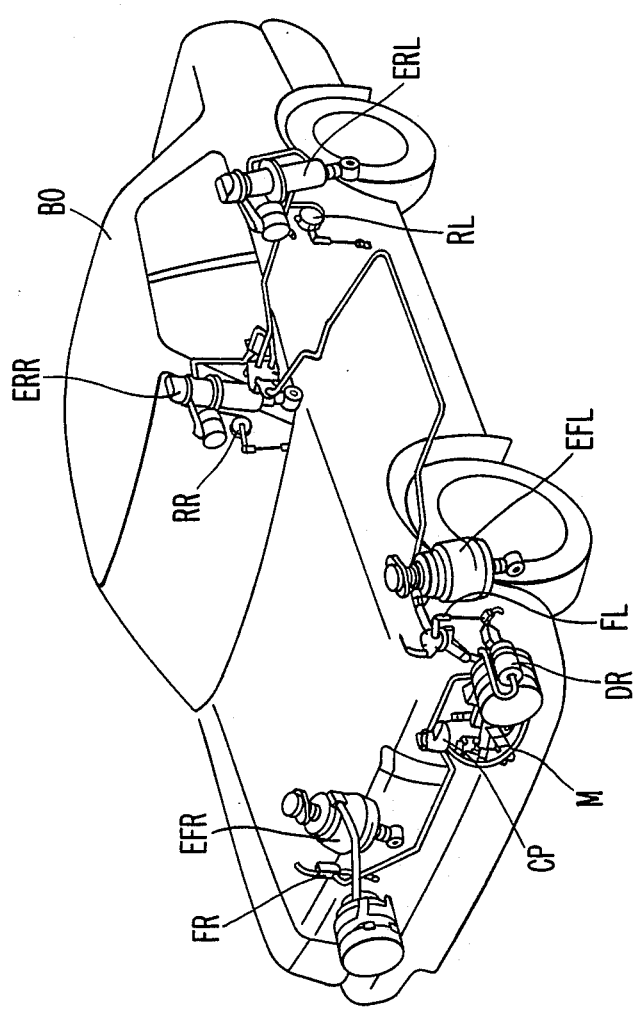
FIG. 2 is a perspective view of a vehicle illustrating the allocation of components of the height control system of FIG. 1.

Referring now to FIGS. 1 and 2, a vehicle height control system comprises a control processor or electronic control unit ECU in the form, for example, of a program controlled micro-computer. A vehicle speed sensor SS is used as a speedometer in which the vehicle speed is detected as a reciprocal of a pulse cycle. A compressor CP which is driven or rotated by a motor M is used as a fluid pressure source. The motor M is actuated by a command from control unit ECU transmitted via a relay RY. A dryer DR may be employed as a means for eliminating moisture or undesirable condensation in the fluid to be supplied via a fluid line from the compressor CP to a first air suspension device EFR for a right front wheel, a second air suspension device EFL for a left front wheel, a third air suspension device ERR for a right rear wheel and a fourth air suspension device ERL for a left rear wheel. While a four wheel vehicle is discussed for convenience, the present vehicle height control system may in principle be applied in a vehicle having a greater number of wheels. For example, trucks may typically comprise four rear wheels driven by the same axle or eight rear wheels mounted four to an axle. An exhaust solenoid valve EX is a normally closed valve and is under the control of the control unit ECU. Upon the downward movement of the body of a vehicle, the valve EX is opened so as to supply the fluid pressure to each air suspension device.

Three selection switches LOW SW, NORMAL SW and HIGH SW, each of which is in a normally opened state, are connected to the control unit ECU. Upon closure of the switch LOW SW (NORMAL/HIGH SW), the height of the body is adjusted to a low (normal/high) level. That is to say, the height of the body is set to one of three levels.

A first sensor FR is a detecting instrument or means for detecting height between the vehicle body BO (FIG. 2) and a rotating center of the right front wheel or one end of a front axle. The first air suspension device EFR is provided between the body BO and a rotating center of the right front wheel or one end of a front axle and varies the height therebetween in accordance with fluid pressure. For controlling the supply of the fluid pressure to the first suspension device, a first solenoid valve VFR is employed.

A second sensor FL is a detecting instrument or means for detecting height between the vehicle body BO and a rotating center of the left front wheel or the other end of the front axle. The second air suspension device EFL is provided between the body BO and a rotating center of the left front wheel or one end of the front axle and varies the height therebetween in accordance with fluid pressure. For controlling the supply of the fluid pressure to the second suspension device, a second solenoid valve VFL is employed.

A third sensor RR is a detecting instrument or means for detecting height between the vehicle body BO and a rotating center of the right rear wheel or one end of a rear axle. The third air suspension device ERR is provided between the body BO and a rotating center of the right rear wheel or one end of a rear axle and varies the height therebetween in accordance with fluid pressure. For controlling the supply of the fluid pressure to the third suspension device, a third solenoid valve VRR is employed.

A fourth sensor RL is a detecting instrument or means for detecting height between the vehicle body BO and a rotating center of the left rear wheel or the other end of the rear axle. The fourth air suspension device ERL is provided between the body BO and a rotating center of the left wheel or the other end of the rear axle and varies the height therebetween in accordance with fluid pressure. For controlling the supply of the fluid pressure to the fourth suspension device, a fourth solenoid valve VRL is employed.

A first mode of operation of the vehicle height control system is outlined as follows and described in reference to FIGS. 3–7 or FIGS. 8–11 and FIG. 13. A first summation of outputs of the first sensor and the fourth sensor is calculated. Also, a second summation of outputs of the second sensor and the third sensor is calculated. The first summation is compared to the second summation, for example, by calculating the difference between them. If the difference between the first and second summation outputs is within a predetermined range, the unit ECU begins to operate the vehicle body height adjustment via a vehicle height control routine. However, if the difference is outside of the range, then, it is assumed that, for example, the vehicle has run onto the curb and no height adjustment will be actuated.

A second mode of operation of the vehicle height control device is outlined according to FIGS. 8–13. After a predetermined time required for exhausting fluid pressure from any one of the air suspension devices has lapsed, output of the corresponding sensors or the actual height of the vehicle body detected thereby is checked. If the lowering movement of the body is smaller than a predetermined level, further lowering movement of the vehicle body is stopped. On the other hand, if the lowering movement has failed to accomplish its objective height, then, further lowering is actuated. Further details of the second mode of operation of the vehicle height control device is shown in the flow-charts of FIGS. 8–12 (especially FIG. 12) and a table as shown in FIG. 13.

FIGS. 3–7 generally described the operation of microprocessor ECU for controlling vehicle height in a normal mode of operation within predetermined boundaries.

Figure 3:
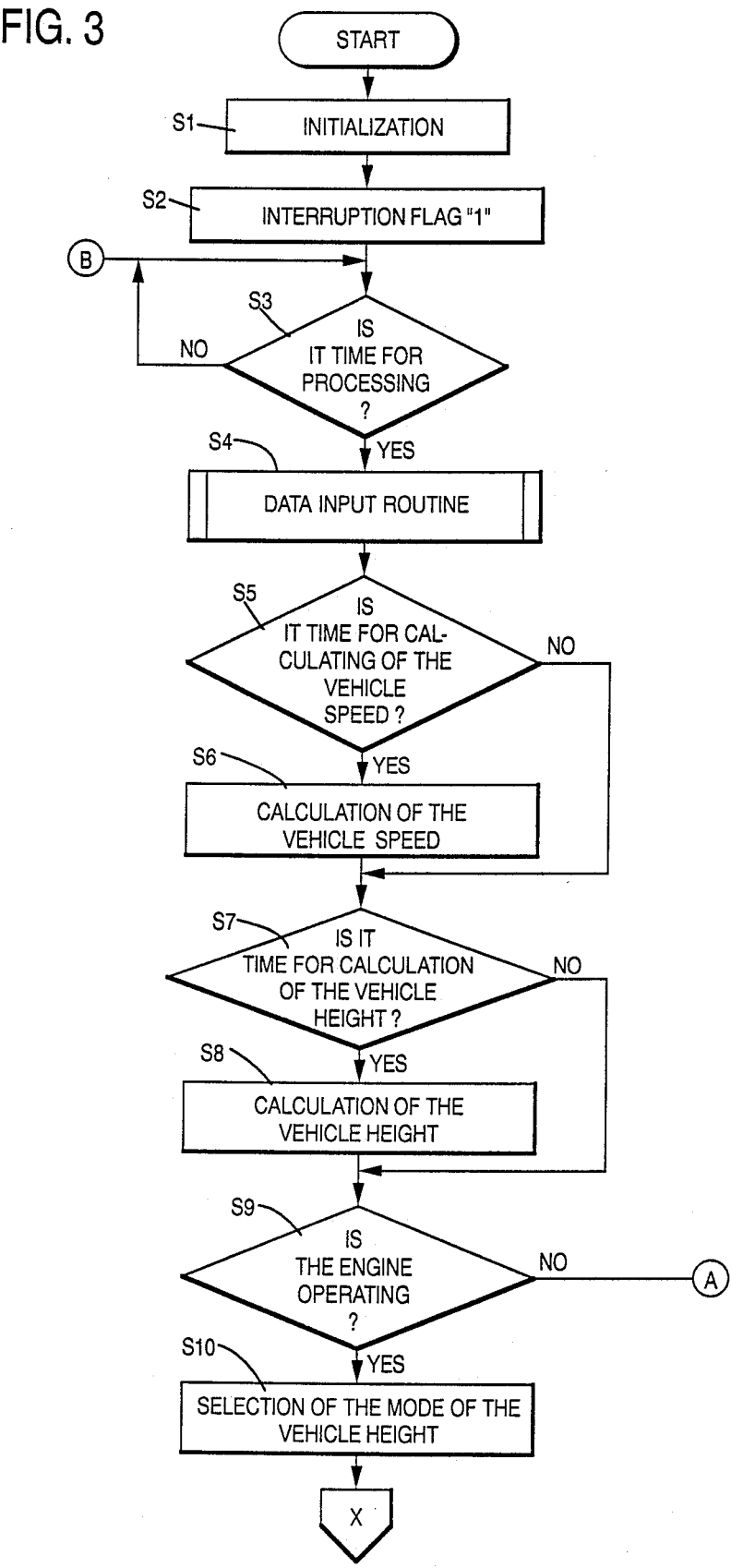
FIGS. 3 through 6 comprise a set of flow-charts for indicating a first mode of operation of the vehicle height control system.

Referring to FIG. 3, at box S1, all appropriate parameters are initialized. A control interruption flag is set at box S2 at "1". At box S3 and depending upon the input from point B in FIG. 6 or the input since initialization, it is determined if it is appropriate to begin data processing in accordance with the present invention.

At box S4, input data from sensors speedometer SS and already known conditions stored in memory are collected according to a data input routine. At box S5, it is determined whether it is appropriate to calculate vehicle speed. Sensed data inputs, for example, may indicate that vehicle speed calculation is unnecessary. If vehicle speed is to be calculated, then calculation occurs at box S6.

At box S7, it is determined whether it is appropriate to calculate a vehicle height. If so, vehicle height is calculated at box S8 according to input data.

Figure 6:
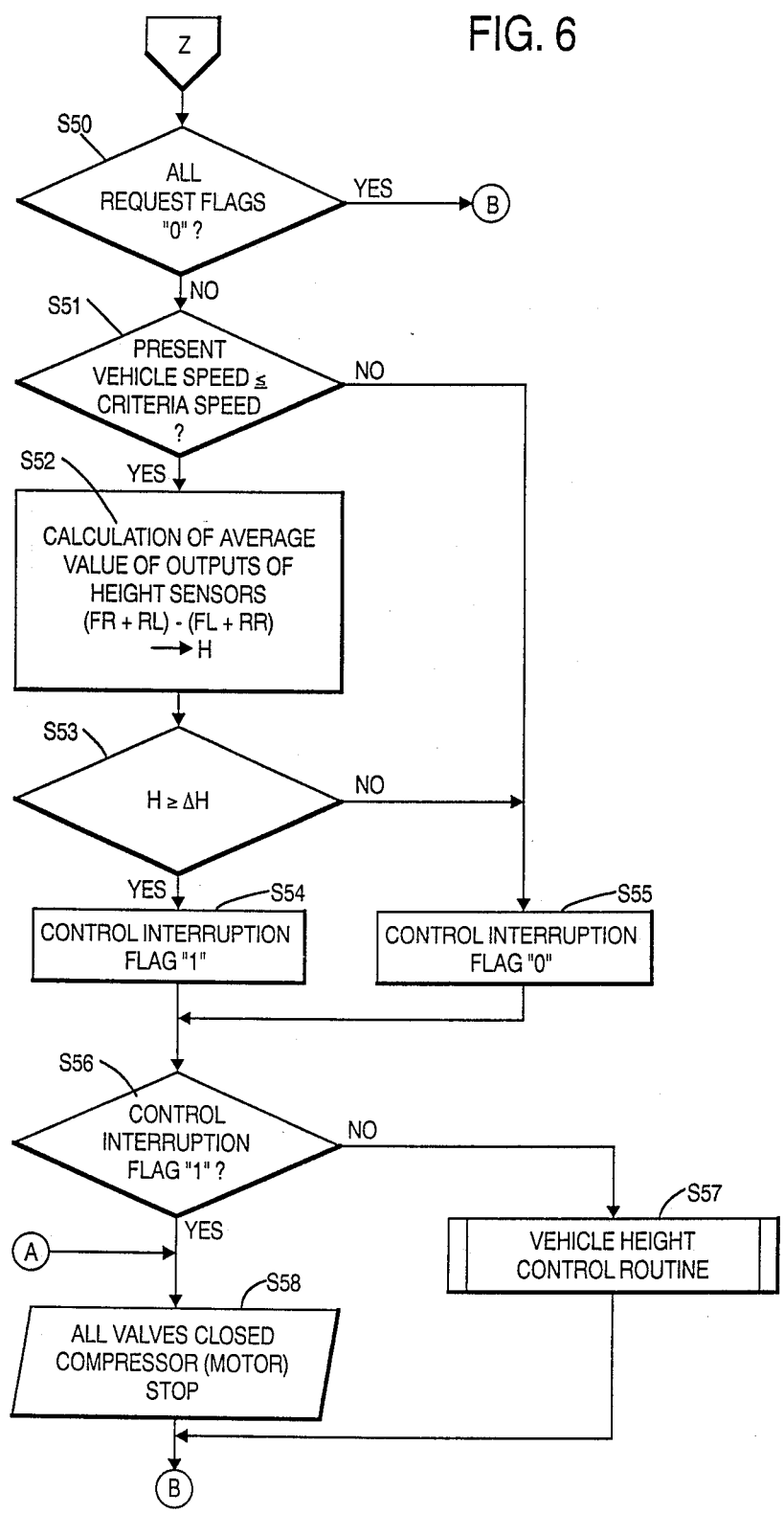
Figure 8:
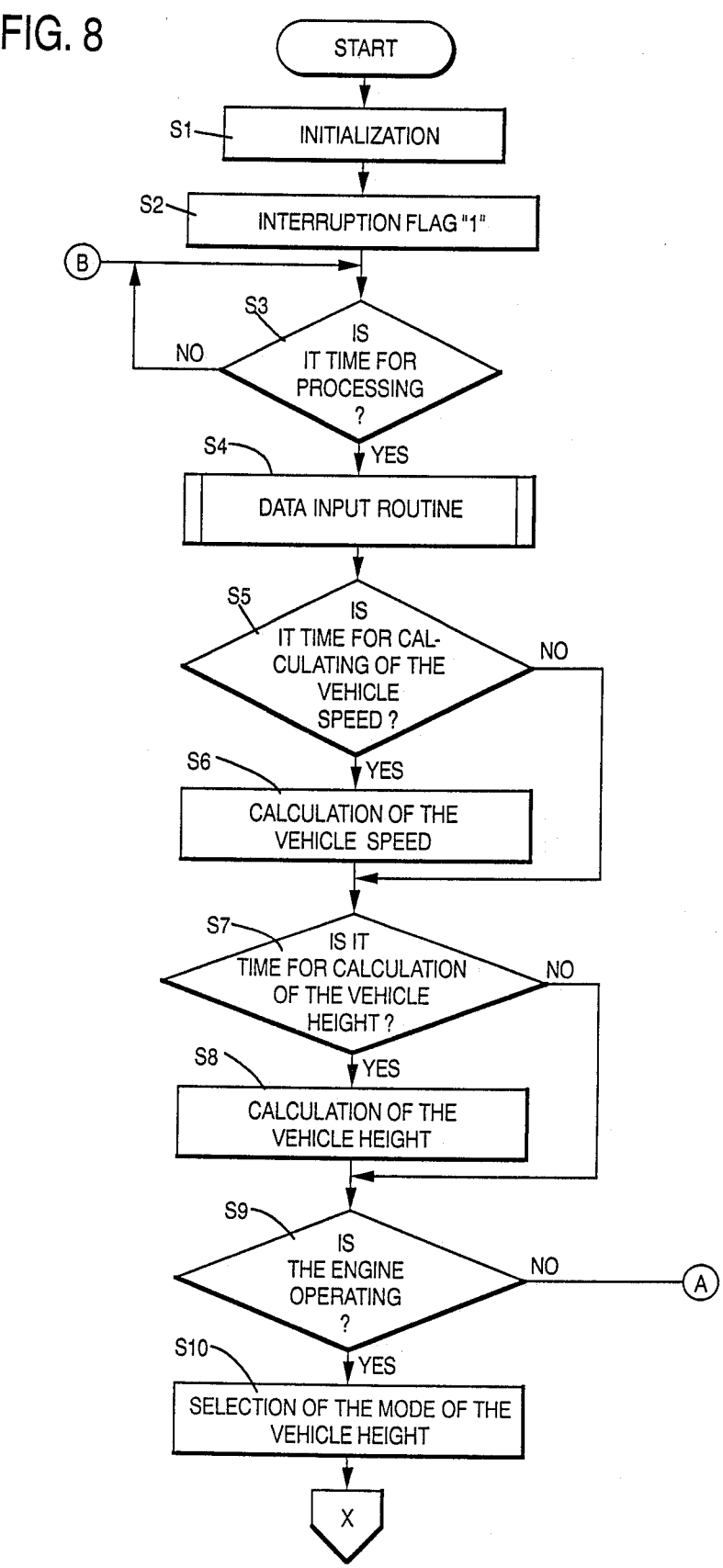
FIGS. 8 through 12 comprise a set of flow-charts for indicating a second mode of operation of the vehicle height control system of FIG. 1.
Figure 9:
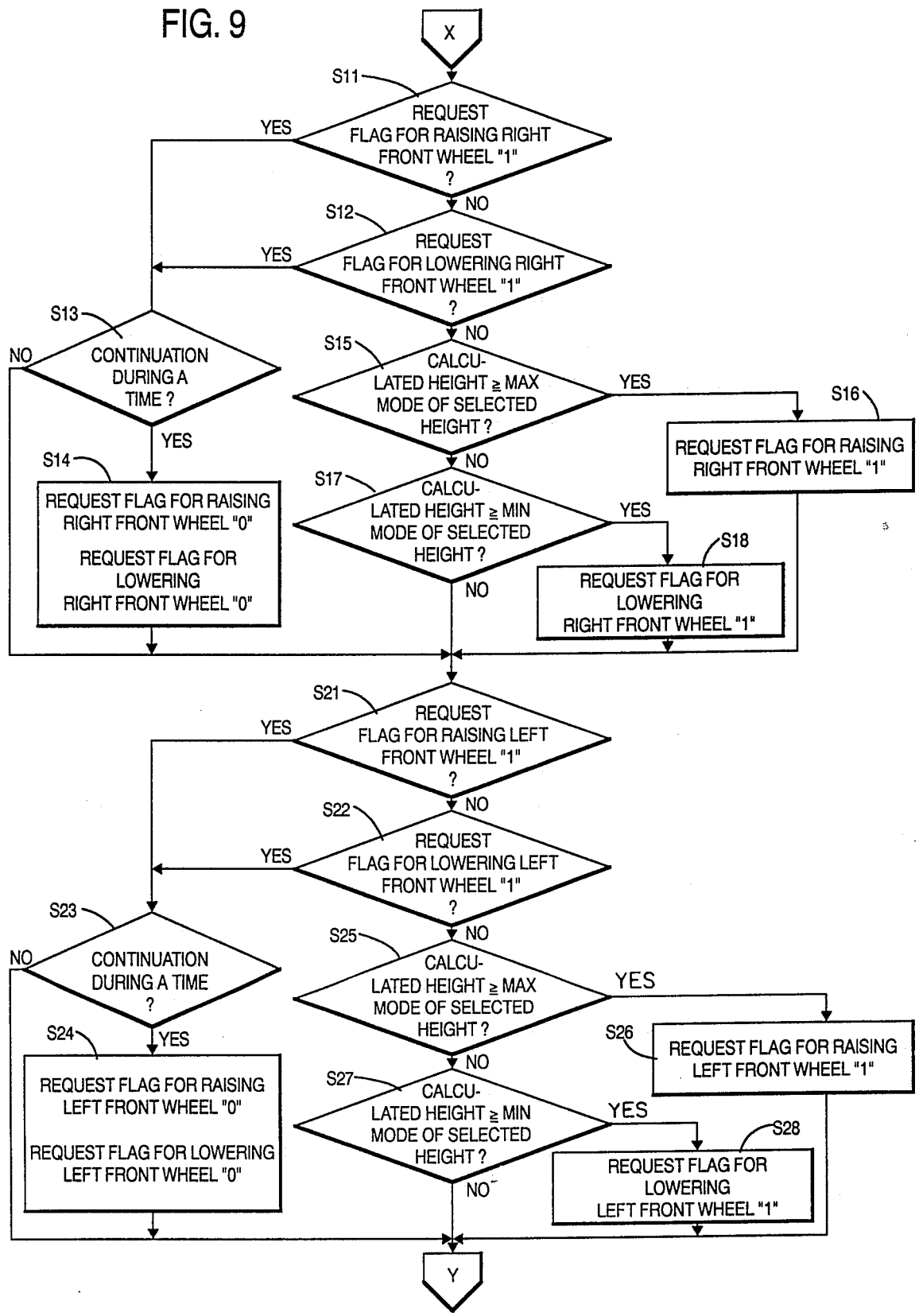
Figure 10:
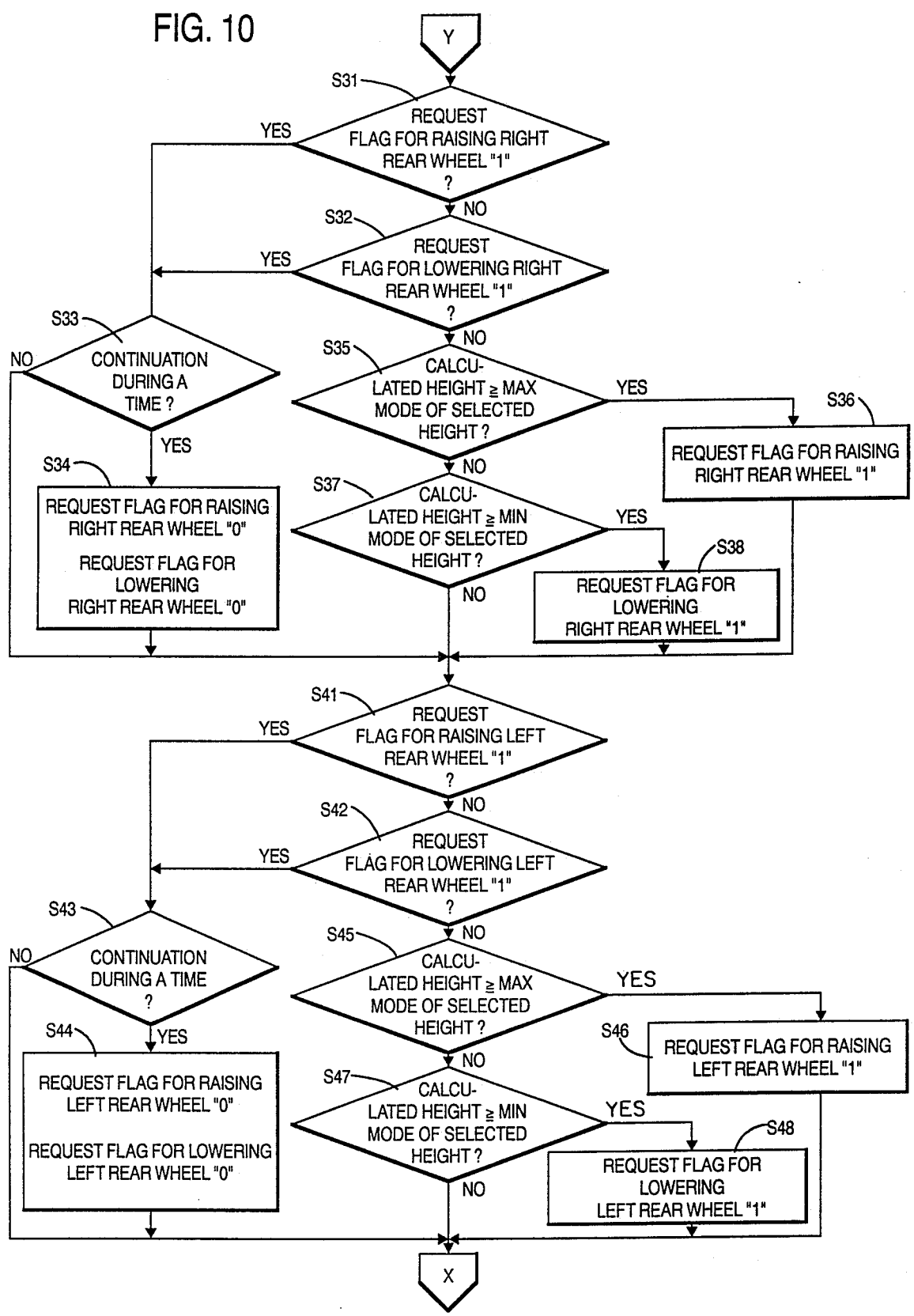

At box S9, box S58 of FIG. 6 is entered at point A if the engine is not operating or if the engine is operating, the progress of the algorithm according to FIG. 3 continues.

At box S10, it is determined that the height control is to be adjusted according to a selected mode of vehicle height, i.e., low, normal or high.

Figure 4:
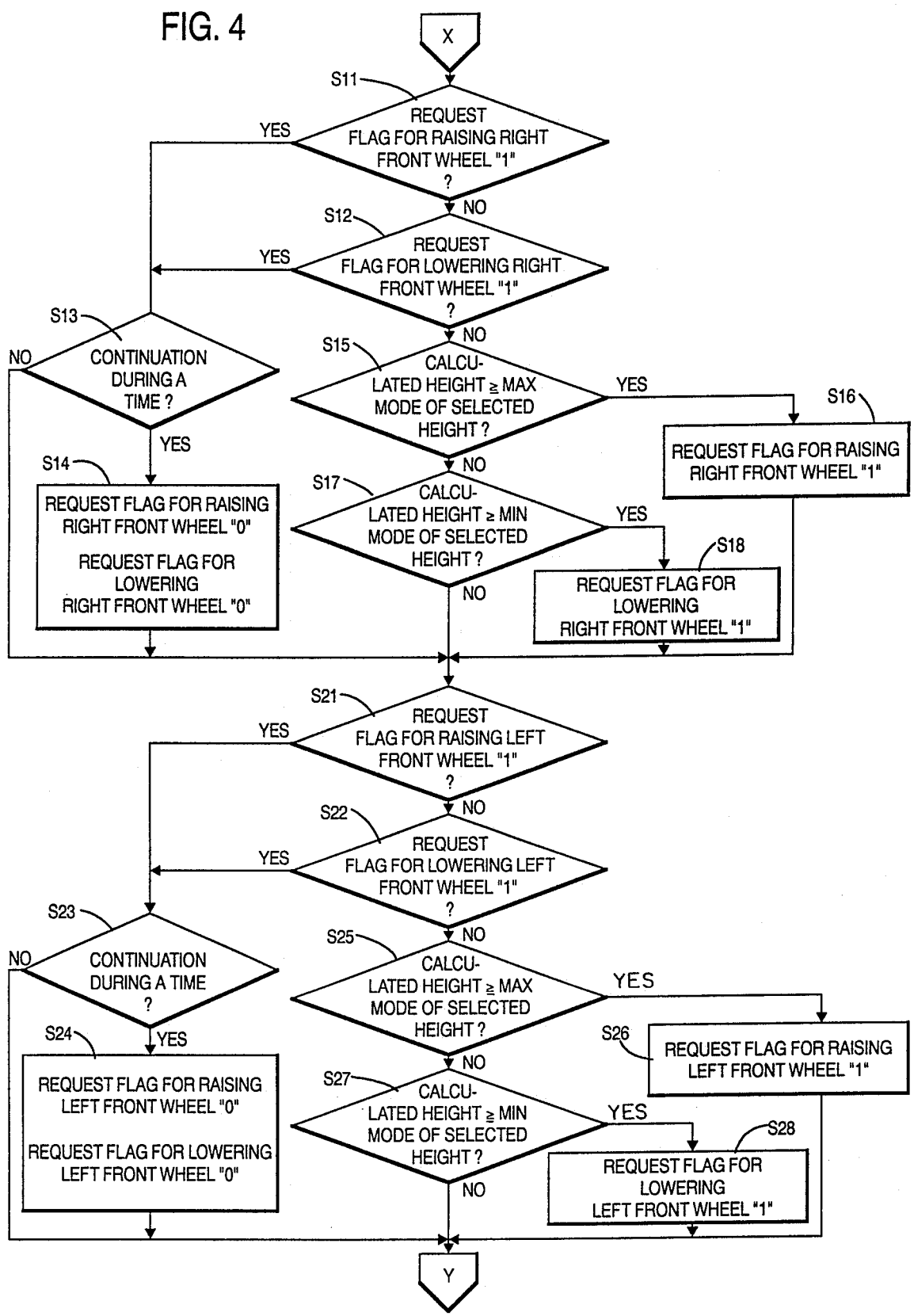
Figure 5:
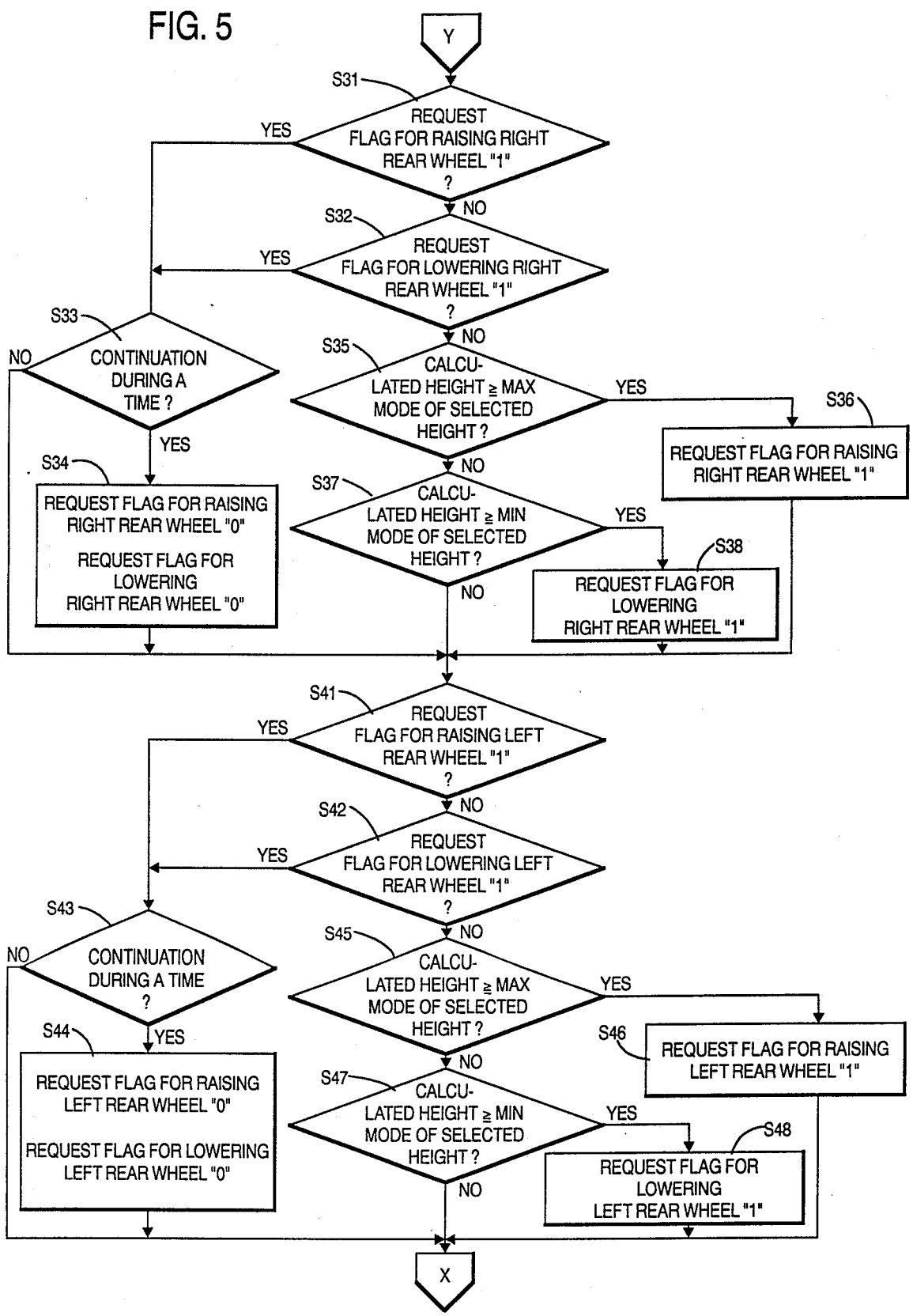

Referring now to FIGS. 4 and 5 at boxes S11–S48, flags are set for either raising or lowering each of the four wheels of a vehicle depending on the sensed input data and the selected mode at box S10. Boxes S15 through S18, for example, determine whether calculated height is within certain limits for the right front wheel, S25 through S27 relate to the left front wheel and so on. Of course, if a greater number of wheels are involved, the number of sequential flag setting routines may accordingly have to be increased depending, for example, on the number of axles, wheels per axle and so on.

Referring to FIG. 6 and once the appropriate request flags have been set for raising and lowering wheels, the flags are regarded to determine if they are all "0" at box S50. If all zero, then control continues to point B of FIG. 3; otherwise, the vehicle speed in relation to a predetermined speed level is determined at box S51.

The calculation of the difference between the sums of the calculations for the front right and left rear wheels and for the front left and right rear wheels is determined at box S52 and set to "H". At box S53, if "H" is greater than a predetermined error variation of ΔH, a control interrupt flag is set to "1"; otherwise, it is set to zero at box S55.

If the number of wheels is greater than four, the calculation of the difference of sums for the several wheels or axles must be accordingly modified.

If the control interrupt flag is set to 1 at box S56, box S58 is entered in which all valves are closed and the compressor is turned off; otherwise, the vehicle height control routine is entered at box S57. Operation of the control unit ECU then returns to point B in FIG. 3.

FIG. 7 provides a tabular summary of all the possible states of all valves and the compressor motor in relation to the operation desired for a given wheel as well as the status of a control interrupt request where all elements should be off.

Figure 11:
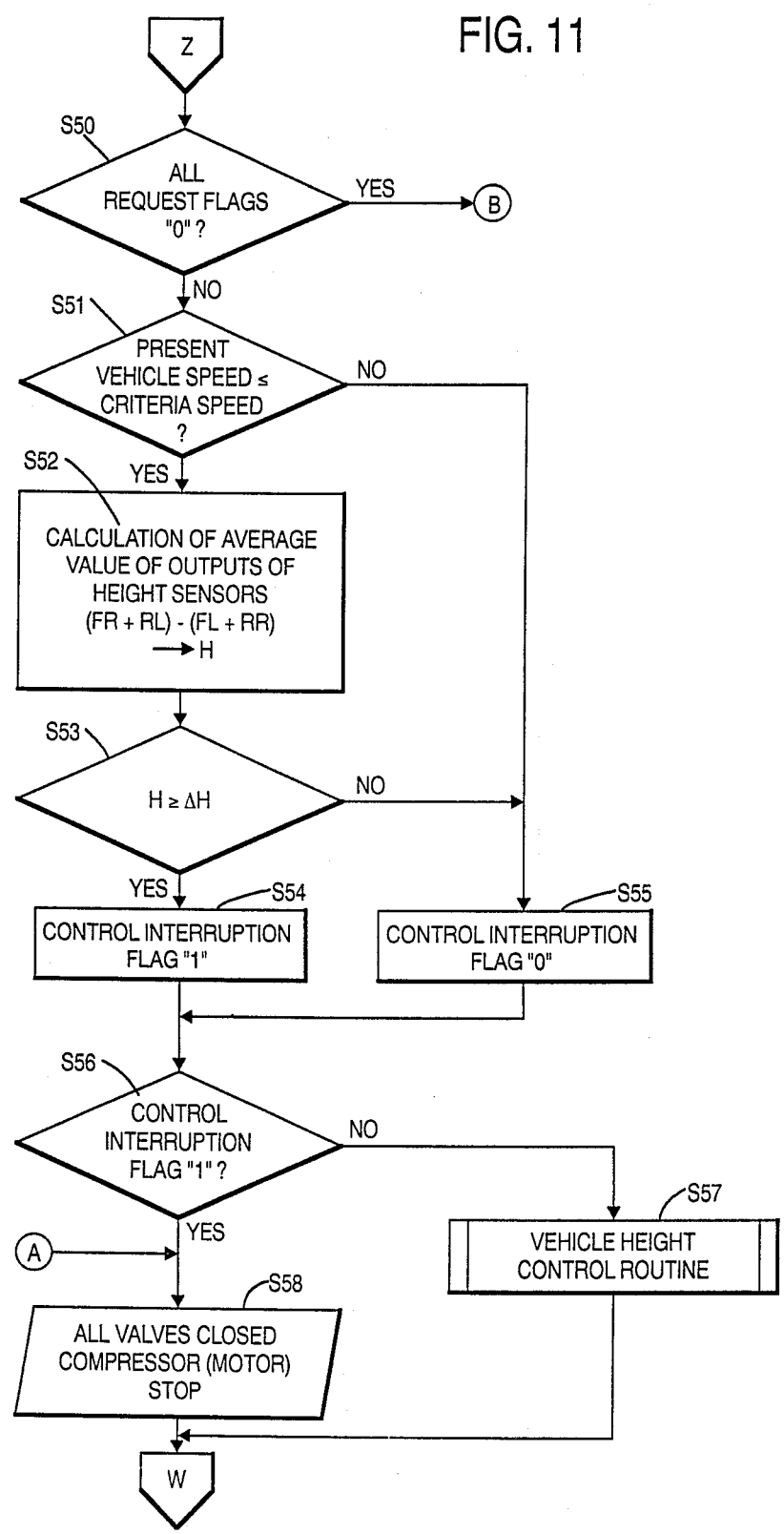
Figure 12:
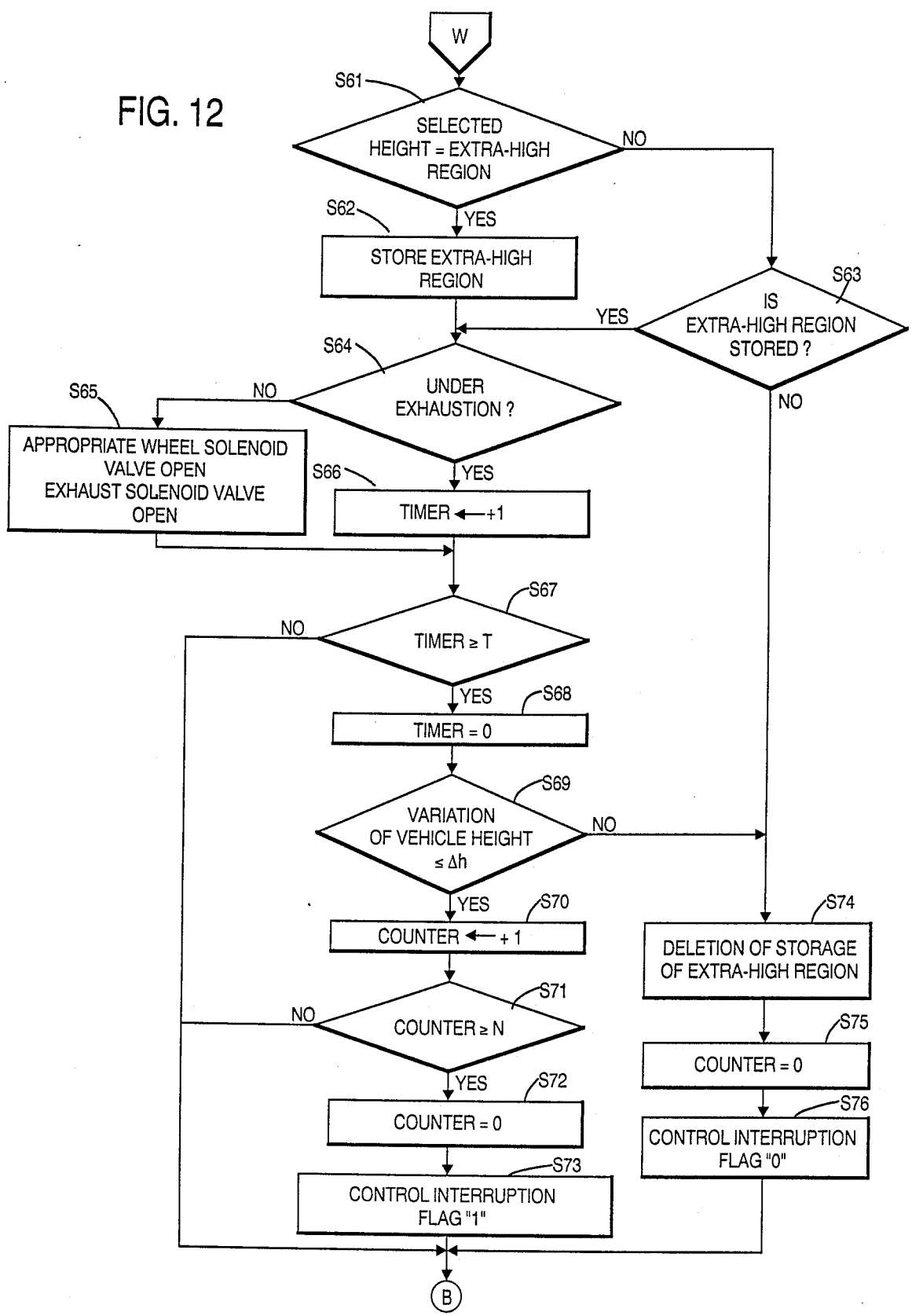

FIGS. 8–11 and FIG. 13 are practically identical to FIGS. 3–7 and describe a normal mode of operation of the present invention while in accordance with FIG. 12 a further routine is described in flowchart form and entered from FIG. 11 wherein the height sensed at particular sensors is determined and further lowering of the vehicle controlled over time. Instead of returning to point B at the completion of FIG. 11, point W of FIG. 12 is entered.

Referring to box S61, it is determined whether the selected height equals the extra high region, if so, the extra high region is stored at box S62. Otherwise, control passes to box S63. At box S64, it is determined if the valves are under exhaustion. If not, the appropriate wheel solenoid valve is set to open and the exhaust valve also set to open; otherwise, a timer counter is incremented by "1". If the timer counter is greater than or equal to a predetermined period of time or count T at box S67, then, the timer is reset to 0 at box S68. The variation in vehicle height is checked to determine if it is within a predetermined variation Δh at box S69. If so, a counter is incremented at box S70. If the count of the number of times control has passed via box S70 is greater than or equal to a predetermined number N, then the counter is reset to 0 at box S72 and the control interrupt flag is set to "1" at box S73. Control is returned to point B of FIG. 8.

If on the other hand, at box S63, the extra high region is not stored, the extra high region is checked at box S74, the counter is set to zero at box S75, and the control interrupt flag set to "0" at box S76. Control after either boxes S73 or box S76 passes finally to point B of FIG. 8. Also, if either the timer or the counter have not reached T or N respectively, then, control is returned to point B.

Obviously, numerous modifications and variations of the present invention are possible in light of the above teachings. It is therefore to be understood that within the scope of the appended claims, the invention may be practiced otherwise than as specifically described herein.

We claim:

1. A height control device for a vehicle, the vehicle comprising a body, at least two axles with a first wheel and a second wheel rotatably disposed near to opposite ends of each of said axles, the device comprising:
   suspension means operated by fluid pressure for generating vertical movement between said body and each of said wheels comprising a suspension device provided near each said wheel;
   a fluid pressure source;
   a suspension valve corresponding to each said suspension device and disposed between each said suspension device and said fluid pressure source;
   an exhaust valve in pneumatic communication with each said suspension valve means and said fluid pressure source;
   a height sensor for detecting a height between a rotating center of each said wheel and said body and outputting a signal representative thereof;
   a speed sensor for detecting and generating an output signal representative of the speed of said vehicle; and
   control means having at least a first and a second possible vehicle operating condition for controlling at least one of said suspension valve means to operate the corresponding suspension device and controlling said exhaust valve means to vary the fluid pressure presented to said suspension devices;
   said first possible vehicle operating condition being whenever the difference between said output signals of any two height sensors is greater than a first predetermined amount and the output signal from said speed sensor indicates a vehicle speed greater than a second predetermined value;
   said second possible vehicle operating condition being whenever the difference between said output signals of any two height sensors is greater than a first predetermined amount and the output signal from said speed sensor indicates a vehicle speed less than a second predetermined amount;
   said control means, responsive to said height sensor output signals in said first possible vehicle operating condition, permitting control of said vertical movement between said body and said wheels to obtain a new vehicle height position; and
   said control means, responsive to said height sensor output signals in said second possible vehicle operating condition, inhibiting control of said vertical movement between said body and said wheels to retain a current vehicle height position.

2. The height control device for a vehicle set forth in claim 1 wherein said control means further provides means for controlling at least one of said suspension valves to operate the corresponding suspension device when a period of exhausting fluid from said corresponding suspension device over a predetermined period of time fails to accomplish a desired lowering movement of said body with respect to a wheel, said height between said body and the center of said wheel being detected by a corresponding height sensor.

3. The height control device for a vehicle set forth in claim 2 where at least one axle for mounting at least two wheels rotatably disposed at at least one end of at least one axle and at least one suspension device being disposed at the end of said axle near said at least two wheels.

4. The height control device for a vehicle set forth in claim 3 where the device further comprising at least one suspension device disposed near each said wheel.

5. The height control device for a vehicle set forth in claim 1 where at least one axle for mounting at least two wheels rotatably disposed at at least one end of at least one suspension device being disposed at the end of said axle near said at least two wheels.

6. The height control device for a vehicle set forth in claim 5 where the device further comprising at least one suspension device disposed near each said wheel.

7. A height control device for a vehicle, the vehicle comprising a body, at least two axles with a first and a second wheel rotatably disposed near to opposite ends of each said axles, the device comprising:
   suspension means operated by fluid pressure for generating vertical movement between said body and each of said wheels comprising a suspension device provided near each said wheel;

a fluid pressure source;

a suspension valve disposed between each said suspension device and said fluid pressure source;

an exhaust valve in pneumatic communication with each said suspension valve means and said fluid pressure source;

a height sensor for detecting a height between a rotating center of each said wheel and said body and outputting a signal representative thereof;

a speed sensor for detecting and generating an output signal representative of the speed of said vehicle; and control means having at least a first and a second possible vehicle operating condition for controlling at least one of said suspension valve means to operate the corresponding suspension device and controlling said exhaust valve means to vary the fluid pressure presented to said suspension devices;

said first possible vehicle operating condition being whenever the difference between a first summation of said height sensor outputs and a second summation of said height sensor outputs is less than a first predetermined amount and the output signal from said speed sensor indicates a vehicle speed greater than a second predetermined amount;

said second possible vehicle operating condition being whenever the difference between said first summation of said height outputs and said second summation of said height outputs is less than a first predetermined amount and the output signal from said speed sensor indicates a vehicle speed less than a second predetermined amount;

said first summation of outputs comprising an output of a first said height sensor of a first axle and an output of a second said height sensor of a second axle, said second height sensor being disposed on the opposite side of said vehicle from the first said height sensor;

said second summation of outputs comprising an output of a third said height sensor disposed oppositely from the first said height sensor of the first said axle and an output of a said fourth said height sensor being disposed oppositely from the second said height sensor of the second said axle;

said control means, responsive to said height sensor output signals in said first possible vehicle operating condition, permitting control of said vertical movement between said body and said wheels to obtain a new vehicle height position; and said control means, responsive to said height sensor output signals in said second possible vehicle operating condition, inhibiting control of said vertical movement between said body and said wheels to retain a current vehicle height position.

8. The height control device for a vehicle set forth in claim 7 wherein said control means further provides means for controlling at least one of said suspension valve to operate the corresponding suspension device when a period of exhausting of fluid from said corresponding suspension device for a predetermined period of time fails to accomplish a desired lowering movement of said body with respect to a wheel, said height between said body and the center of said wheel being detected by a corresponding height sensor.

9. The height control device for a vehicle set forth in claim 8 where at least one axle for mounting at least two wheels rotatably disposed at at least one end of at least one axle and at least one suspension device being disposed at the end of said axle near said at least two wheels.

10. The height control device for a vehicle set forth in claim 9 where the device further comprising at least one suspension device disposed near each wheel.

11. The height control device for a vehicle set forth in claim 7 where at least one axle for mounting at least two wheels rotatably disposed at at least one end of at least one axle and at least one suspension device being disposed at the end of said axle near said at least two wheels.

12. The height control device for a vehicle set forth in claim 11 where the device further comprises one suspension device disposed near each said wheel.

13. In a height control system for a vehicle, the vehicle comprising a body, at least two axles with a first wheel and a second wheel rotatably disposed near to opposite ends of each of said axle;

a suspension means operated by fluid pressure for generating vertical movement between said body and each of said wheels comprising a suspension device provided near each said wheel;

a fluid pressure source;

a suspension valve disposed between each said suspension device and said fluid pressure source;

an exhaust valve in pneumatic communication with each said suspension valve means and said fluid pressure source;

a height sensor for detecting a height between a rotating center of said wheel and said body and outputting a signal representative thereof;

a speed sensor for detecting and generating an output signal representative of the speed of said vehicle;

a control means having at least a first and a second possible vehicle operating conditions for controlling at least one of said suspension valve means to operate the corresponding suspension device and controlling said exhaust valve means to vary the fluid pressure presented to said suspension devices;

a process for performing vehicle height control comprising the steps of:

monitoring the variation of said signal representing vehicle speed;

monitoring the variation of said signals representing vehicle height;

determining whether a first possible vehicle operating condition or a second possible vehicle operating condition exists based on variation of said signal representing vehicle speed and said signals representing vehicle height;

responding to said signals representing vehicle height if said first possible vehicle operating condition exists or ignoring said signals representing vehicle height if said second possible vehicle operating conditions exists;

said first possible vehicle operating condition being whenever the difference between said output signals of any two said height sensors is greater than a first predetermined amount and the output signal from said speed sensor indicates a vehicle speed greater than a second predetermined amount; and said second possible vehicle operating condition being whenever the difference between said output signals of any two said height sensors is less than a first predetermined amount and the output signal from said speed sensor indicates a vehicle speed less than a second predetermined amount.

14. The process set forth in claim 13 which further comprises the step of monitoring said signals representing vehicle height for a predetermined period of time to determine if the suspension system has responded to control signals provided by the the control means.

* * * * *